(12) United States Patent (10) Patent No.: US 12,570,132 B2
Kim et al. (45) Date of Patent: Mar. 10, 2026

(54) FRAME FOR ELECTRIC VEHICLE

(71) Applicants: Hyundai Motor Company, Seoul
(KR); Kia Corporation, Seoul (KR)

(72) Inventors: Nam Ho Kim, Gwangmyeong-si (KR);
Won Hae Lee, Seoul (KR); **Byung Joo
Chung, Gunpo-si (KR); Seung Hak
Lee, Asan-si (KR); Min Seok Kim**,
Seoul (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 814 days.

(21) Appl. No.: 17/892,466

(22) Filed: Aug. 22, 2022

(65) Prior Publication Data

US 2023/0249534 A1 Aug. 10, 2023

(30) Foreign Application Priority Data

Feb. 7, 2022 (KR) ........................ 10-2022-0015600

(51) Int. Cl.
B60K 1/04 (2019.01)
B60K 1/00 (2006.01)
B62D 25/20 (2006.01)

(52) U.S. Cl.
CPC ............ B60K 1/04 (2013.01); B62D 25/2018
(2013.01); B62D 25/2027 (2013.01); **B60K
2001/003 (2013.01); B60K 2001/0438**
(2013.01)

(58) Field of Classification Search
CPC ................ B60K 1/04; B60K 2001/003; B60K
2001/0438; B62D 25/2018; B62D
25/2027
See application file for complete search history.

(56) References Cited

U.S. PATENT DOCUMENTS

| | | | | |
|---|---|---|---|---|
| 7,469,957 | B1* | 12/2008 | Boettcher | .......... B62D 25/2018 |
| | | | | 296/193.07 |
| 8,960,776 | B2* | 2/2015 | Boettcher | .............. B62D 25/20 |
| | | | | 296/29 |
| 11,926,364 | B2* | 3/2024 | Kim | ....................... B62D 21/12 |
| 12,115,846 | B2* | 10/2024 | Fukuoka | ................ B62D 25/20 |
| 12,202,543 | B2* | 1/2025 | Cochrane | ............... B62D 21/02 |
| 2013/0126255 | A1 | 5/2013 | Saeki | |
| 2013/0175829 | A1 | 7/2013 | Kim et al. | |
| 2013/0206496 | A1* | 8/2013 | Hashimoto | ............ B62D 21/12 |
| | | | | 180/291 |
| 2017/0001507 | A1* | 1/2017 | Ashraf | ............... B62D 25/2027 |
| 2017/0305250 | A1* | 10/2017 | Hara | ................... H01M 50/204 |
| 2019/0351750 | A1* | 11/2019 | Caliskan | ................ B62D 21/07 |
| 2020/0017147 | A1 | 1/2020 | Caliskan et al. | |
| 2021/0091352 | A1 | 3/2021 | Weicker et al. | |
| 2021/0101641 | A1 | 4/2021 | Kim et al. | |

(Continued)

FOREIGN PATENT DOCUMENTS

| | | | |
|---|---|---|---|
| JP | 3016325 | B2 | 3/2000 |
| KR | 10-2020-0080706 | A | 7/2020 |

(Continued)

*Primary Examiner* — Jacob B Meyer

(74) *Attorney, Agent, or Firm* — Morgan, Lewis &
Bockius LLP

(57) ABSTRACT

A frame for an electric vehicle includes a front part frame
located at a front of the vehicle; a rear part frame located at
a rear of the vehicle; and a central part frame configured in
a flat shape to be coupled between the front part frame and
the rear part frame and to accommodate a battery therein.

19 Claims, 12 Drawing Sheets

(56)     References Cited

U.S. PATENT DOCUMENTS

| | | | |
|---|---|---|---|
| 2021/0331749 A1* | 10/2021 | Hwang | B62D 65/04 |
| 2023/0231228 A1* | 7/2023 | Taniguchi | H01M 10/6568 |
| | | | 429/72 |
| 2023/0249534 A1* | 8/2023 | Kim | B62D 27/065 |
| | | | 180/68.5 |
| 2023/0264744 A1* | 8/2023 | Kim | B62D 21/152 |
| | | | 296/204 |
| 2024/0001992 A1* | 1/2024 | Lee | H01M 50/209 |

FOREIGN PATENT DOCUMENTS

| | | | | |
|---|---|---|---|---|
| KR | 10-2179788 | B1 | 11/2020 | |
| KR | 10-2251728 | B1 | 5/2021 | |
| KR | 10-2021-0130883 | A | 11/2021 | |
| WO | WO-2022119176 | A1 * | 6/2022 | B60K 1/04 |

* cited by examiner

FRAME FOR ELECTRIC VEHICLE

CROSS-REFERENCE TO RELATED APPLICATION(S)

The present application claims priority to Korean Patent Application No. 10-2022-0015600, filed on Feb. 7, 2022, the entire contents of which is incorporated herein for all purposes by this reference.

BACKGROUND OF THE PRESENT DISCLOSURE

Field of the Present Disclosure

The present disclosure relates to a frame structure of an electric vehicle provided with a high voltage battery (hereinafter, simply referred to as a "battery").

Description of Related Art

Purpose built vehicles (PBVs) may be configured as a life module that provides various types of boarding and loading spaces according to market demands and a drive module related to actual vehicle driving, and it is possible to easily produce various types of vehicles by combining a certain drive module with a life module according to various needs, enabling effective response to the market trend of small-quantity batch production.

PBVs tend to be configured as electric vehicles, and in the instant case, the drive module includes a frame, a battery, and a vehicle driving device including a motor.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a frame for electric vehicle configured for effectively mounting a battery including relatively large weight and volume to a vehicle, greatly increasing the degree of design freedom in terms of securing a space in the vehicle, facilitating an increase in the mileage of the vehicle by increasing the capacity of the battery based on securing the space as described above, relatively reducing the weight and cost of the vehicle, and increasing production efficiency.

In view of the forgoing, a frame for an electric vehicle according to an exemplary embodiment of the present disclosure may include: a front part frame located at a front of the vehicle; a rear part frame located at a rear of the vehicle; and a central part frame configured in a flat shape to be coupled between the front part frame and the rear part frame and to accommodate a battery therein.

The central part frame may be configured in a rectangular flat shape in which first and second sides facing each other are respectively connected to the front part frame and the rear part frame.

The central part frame may include: a front member provided at the front to extend in a transverse direction of the vehicle; a rear member provided at the rear to extend in the transverse direction of the vehicle; and side members connected to first and second end portions of the front member and the rear member on first and second sides of the side members.

The frame for an electric vehicle may further include a longitudinal member extending in a longitudinal direction of the vehicle and a transverse member extending along the transverse direction of the vehicle, which are provided inside a space formed by the front member, the rear member, and the side members, and a battery module forming the battery may be provided in a space formed by the longitudinal member and the transverse member.

The battery module may be fixed to at least one of the longitudinal member and the transverse member inside the central part frame.

Electric battery devices including at least one of a BMU, a PRA, and a fuse may be provided in the space formed by the longitudinal member and the transverse member inside the central part frame.

A lower case may be provided on the lower side of the central part frame to surround the lower side of the space formed by the front member, the rear member, and the side members, and an upper case may be provided on the upper side of the central part frame to surround the upper side of the space formed by the front member, the rear member, and the side members.

A cooling module configured to cool the battery may be provided in a space formed by the front member, the rear member, the side members, the upper case, and the lower case.

The front part frame and the rear part frame may be integrally provided with protrusion coupling members, respectively, that protrude from end portions of the front part frame and the rear part frame facing the central part frame to overlap the central part frame.

The protrusion coupling member may have an open cross-section surrounding a portion of a cross-section of the side members of the central part frame.

The side members of the central part frame may have a rectangular cross-sectional structure, and the protrusion coupling member may have an L-shaped cross-section that surrounds one edge portion on the external side of a vehicle body including the rectangular cross-section of the side members.

Both end portions of the side members of the central part frame may be fixed to the front part frame and the rear part frame by a first horizontal fastening member passing through the protrusion coupling member and the side members in the transverse direction while being respectively inserted into the front part frame and the rear part frame.

The side members of the central part frame may be fixed to the front part frame and the rear part frame by a vertical fastening member passing through the protrusion coupling member and the side members in a vertical direction while overlapping the protrusion coupling member.

A stay may be coupled to the side members of the central part frame to overlap an edge portion of the side members other than an edge portion surrounded by the protrusion coupling member.

The stay may have an L-shaped cross-section to extend in the longitudinal direction of the side members.

The vertical fastening member may pass through the stay, the side members, and the protrusion coupling member in sequence and then be fastened.

The stay may be fixed to the side members by a second horizontal fastening member that passes through the side members and the stay in the transverse direction.

The protrusion coupling member may be provided to surround an upper edge portion of the rectangular cross-section of the side members, and the stay may be provided below the protrusion coupling member to surround a lower edge portion of the rectangular cross-section of the side members.

The present disclosure may effectively mount a battery having relatively large weight and volume to a vehicle, greatly increasing the degree of design freedom in terms of securing a space in the vehicle, facilitate an increase in the mileage of the vehicle by increasing the capacity of the battery based on securing the space as described above, relatively reduce the weight and cost of the vehicle, and increase production efficiency.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
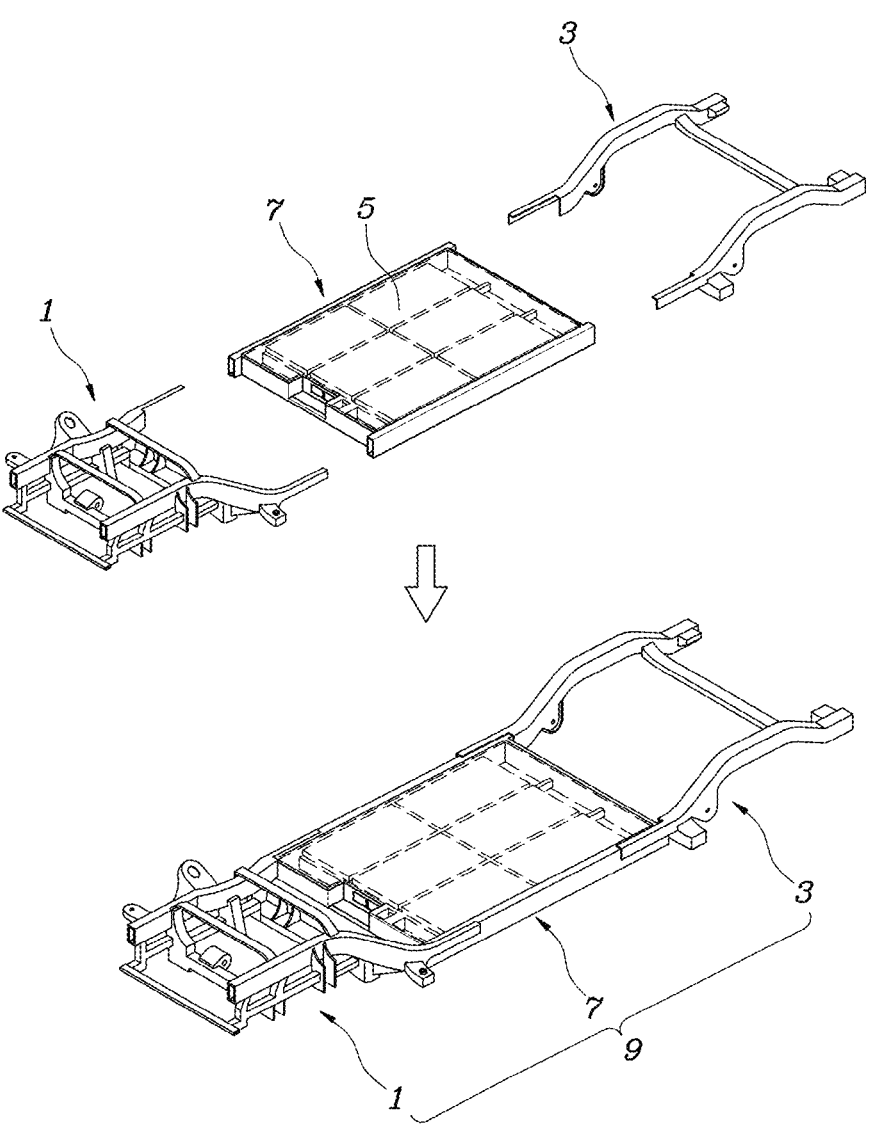
FIG. 1 is a view exemplarily illustrating a frame for an electric vehicle according to an exemplary embodiment of the present disclosure.
Figure 2:
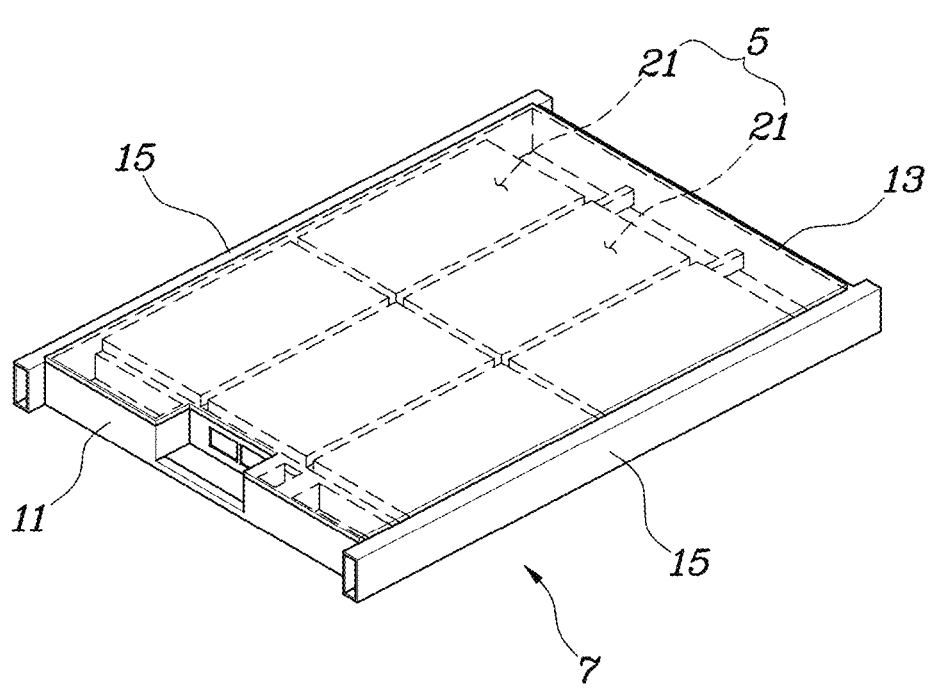
FIG. 2 is a view exemplarily illustrating the central part frame in FIG. 1.
Figure 3:
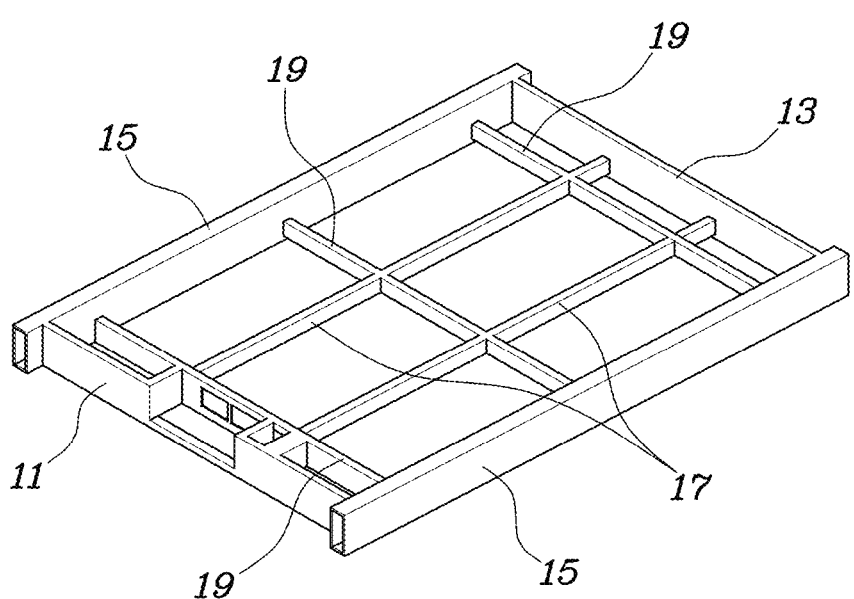
FIG. 3 is a view exemplarily illustrating a state in which a longitudinal member and a transverse member are provided in a space formed by a front member, a rear member, and a side member forming the central part frame in FIG. 2.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A specific structural or functional description of embodiments of the present disclosure set forth in the specification or application is provided merely for describing the exemplary embodiment according to an exemplary embodiment of the present disclosure. Therefore, the exemplary embodiments of the present disclosure may be implemented in various forms, and the present disclosure should not be construed as being limited to the exemplary embodiments described in the specification or application.

Various changes and modifications may be made to the exemplary embodiments according to an exemplary embodiment of the present disclosure, and therefore various exemplary embodiments will be illustrated in the drawings and described in the specification or application. However, it should be understood that embodiments according to the concept of the present disclosure are not limited to the disclosed exemplary embodiments of the present disclosure, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, various exemplary embodiments of the present disclosure will be described in detail with reference to the accompanying drawings. Similar or like reference signs presented in the respective drawings designate similar or like elements.

Referring to FIGS. 1 to 11, an exemplary embodiment of a frame for an electric vehicle according to an exemplary embodiment of the present disclosure includes a front part frame 1 located at the front of the vehicle, a rear part frame 3 located at the rear of the vehicle, and a central part frame 7 in a planar shape to be coupled between the front part frame 1 and the rear part frame 3 and accommodate a battery 5 therein.

That is, the frame 9 for an electric vehicle of the present disclosure configures one frame 9 by the front part frame 1, the central part frame 7, and the rear part frame 3 that are sequentially coupled to each other, and the battery 5 is provided in the central part frame 7, instead of being mounted to the vehicle using a separate battery case accommodating the battery.

Therefore, it is possible to significantly increase the degree of design freedom in terms of securing a space in the vehicle, facilitate an increase in the mileage of the vehicle by increasing the capacity of the battery based on securing the space as described above, relatively reduce the weight and cost of the vehicle, and increase production efficiency.

Furthermore, because the front part frame 1, the central part frame 7, and the rear part frame 3 are respectively manufactured and painted when manufacturing the frame 9 and coupled to each other, unlike the related art, it is possible to perform electrodeposition coating using a relatively small facility and to facilitate easy loading and handling on the vehicle when moving, significantly reducing logistics costs. Furthermore, in the case where a part of the frame 9 is deformed and needs to be replaced due to a collision accident of a vehicle or the like, only the corresponding part may be replaced, providing an advantage of reducing the cost of maintenance of the vehicle.

The central part frame 7 has a rectangular flat shape in which both sides facing each other are respectively connected to the front part frame 1 and the rear part frame 3.

That is, the central part frame 7 includes a front member 11 provided at the front to extend in the transverse direction of the vehicle, a rear member 13 provided at the rear to extend in the transverse direction of the vehicle, and side members 15 provided on both sides to be connected to both end portions of the front member 11 and the rear member 13, respectively.

Furthermore, longitudinal members 17 extending in the longitudinal direction of the vehicle and transverse members 19 extending in the transverse direction of the vehicle are provided in the space formed by the front member 11, the rear member 13, and the side member 15, and a plurality of battery modules 21 forming the battery 5 are provided in the spaces formed by the longitudinal members 17 and the transverse members 19.

A plurality of battery modules 21 is provided in a plane inside the space formed by the front member 11, the rear member 13, and the side member 15 without overlapping each other in the vertical direction, and the central part frame 7 is configured not to have an excessively great thickness in the vertical direction thereof.

The battery module 21 is fixed to at least one of the longitudinal member 17 and the transverse member 19 inside the central part frame 7.

Figure 4:
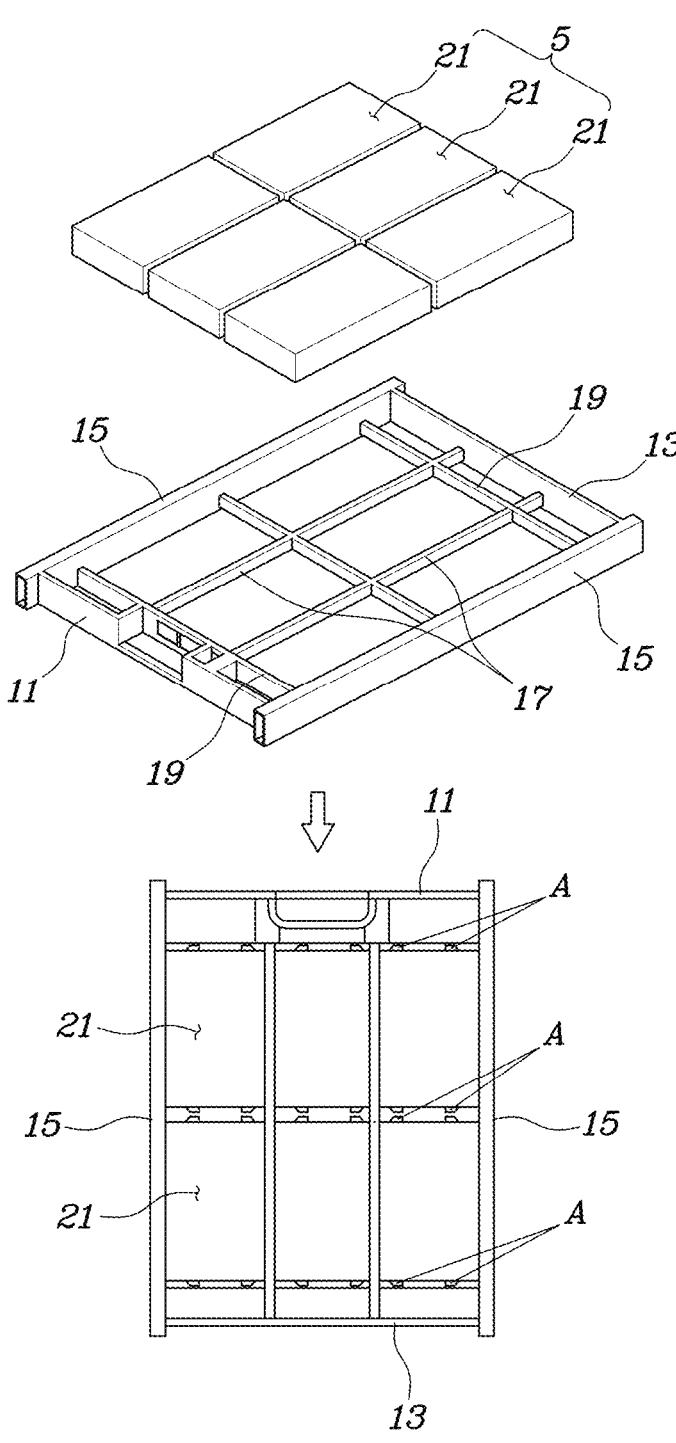
FIG. 4 is a view exemplarily illustrating that a battery module is coupled to the configuration in FIG. 3.

For example, FIG. 4 shows that the battery modules 21 are fixed to the transverse members 19, and reference numeral "A" indicate the portions where the battery modules 21 are fixed to the transverse members 19.

Electric battery devices including at least one of a battery management unit (BMU), a power relay assembly (PRA), and a fuse are provided in the spaces formed by the longitudinal members 17 and the transverse members 19 inside the central part frame 7.

Figure 6:
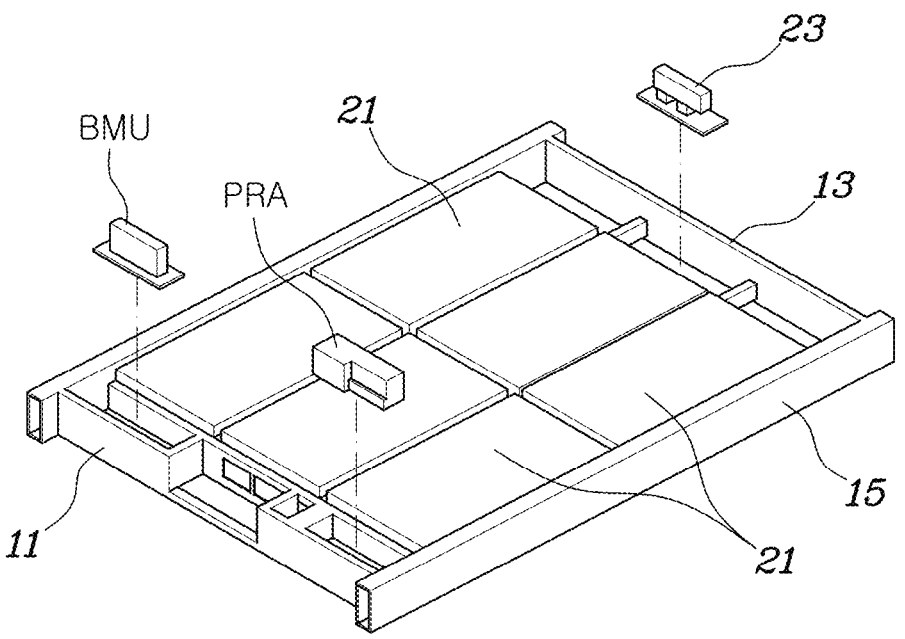
FIG. 6 is a view exemplarily illustrating that battery electrical equipment is provided in the configuration in FIG. 5.
Figure 7:
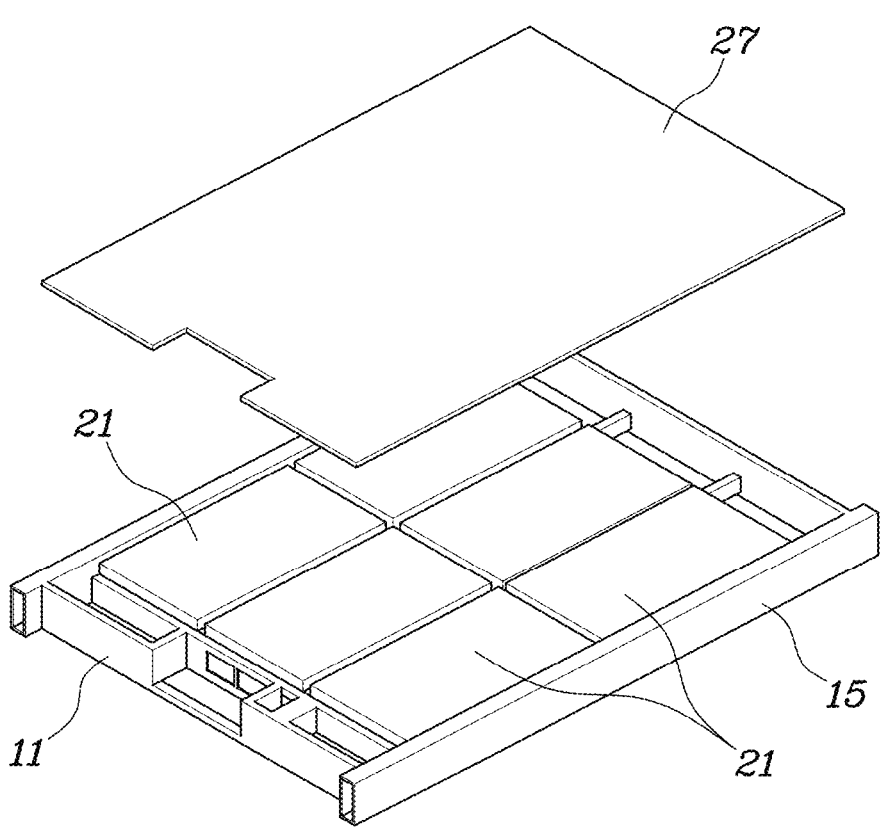
FIG. 7 is a view exemplarily illustrating that an upper case is mounted to the configuration in FIG. 6.
Figure 8:
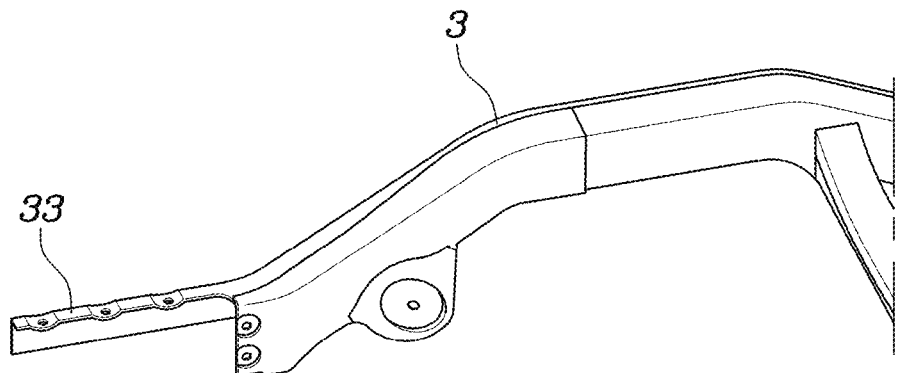
FIG. 8 is a detailed view exemplarily illustrating the front end portion of a rear part frame in FIG. 1.

For example, FIG. 6 illustrates that a BMU, a PRA, and a fuse 23 are provided inside the central part frame 7.

As described above, in the present disclosure, the central part frame 7 itself forms one battery 5 by embedding all of the front member 11, the rear member 13, the side members 15, the longitudinal members 17, and the transverse members 19, which configure a structure, and a plurality of battery modules 21 and electric battery devices therein.

A lower case 25 surrounding the lower side of the space formed by the front member 11, the rear member 13, and the side members 15 is provided on the lower side of the central part frame 7, and an upper case 27 surrounding the upper side of the space formed by the front member 11, the rear member 13, and the side members 15 is provided on the upper side of the central part frame 7.

That is, the battery modules 21 and electric battery devices are embedded in the internal space of the central part frame 7 and enclosed by the upper case 27 and the lower case 25 to seal the upper and lower sides thereof, preventing moisture or foreign substances from entering the battery 5 from the outside.

A cooling module 29 for cooling the battery 5 is provided in the space formed by the front member 11, the rear member 13, the side members 15, the upper case 27, and the lower case 25.

Figure 5:
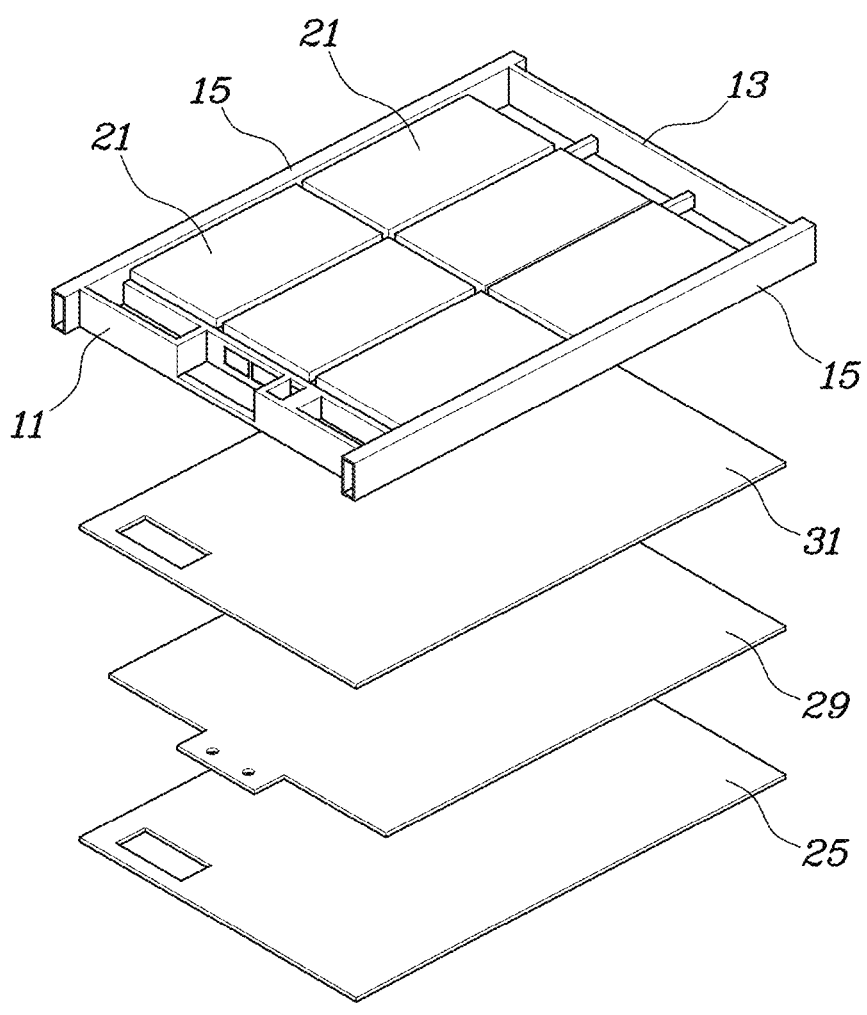
FIG. 5 is a view exemplarily illustrating that a lower case is mounted to the configuration in FIG. 4.

For example, as shown in FIG. 5, a body panel 31 supporting the lower side of the battery module 21 is mounted to the lower side of the battery module 21, and a cooling module 29 is provided between the body panel 31 and the lower case 25, so that a refrigerant circulates through the cooling module 29 to effectively cool the heat generated in the battery 5.

The front part frame 1 and the rear part frame 3 are integrally provided with protrusion coupling members 33, respectively, that protrude from the end portions facing the central part frame 7 to overlap the central part frame 7.

The protrusion coupling members 33 of the front part frame 1 and the rear part frame 3 is configured to secure easy coupling with the central part frame 7 and to increase coupling rigidity.

That is, when coupling the front part frame 1 and the rear part frame 3 to the front and rear of the central part frame 7, the protrusion coupling members 33 guide the front part frame 1 and the central part frame 7 to be easily aligned and guide the rear part frame 3 and the central part frame 7 to be easily aligned, and after the assembly is completed, the protrusion coupling members 33 are configured to increase the rigidity of the coupling portions while overlapping the central part frame 7.

The protrusion coupling member 33 is formed to have an open cross-section that surrounds a portion of the cross-section of the side member 15 of the central part frame 7.

In the present exemplary embodiment of the present disclosure, the side member 15 of the central part frame 7 has a rectangular cross-sectional structure, and the protrusion coupling member 33 is formed to have an L-shaped cross-section that surrounds one edge portion on the external side of the vehicle body including the rectangular cross-section in the side member 15.

Therefore, when assembling the front part frame 1 and the central part frame 7, the protrusion coupling member 33 of the front part frame 1 surrounds one edge portion of the side member 15 of the central part frame 7 to facilitate the alignment between the front part frame 1 and the central part frame 7, which is applied to the assembly between the rear part frame 3 and the central part frame 7 in the same manner.

Both end portions of the side member 15 of the central part frame 7 are respectively inserted into the front part frame 1 and the rear part frame 3 and fixed to the front part frame 1 and the rear part frame 3 by a first horizontal fastening member 35 passing through the protrusion coupling member 33 and the side member 15 in the transverse direction.

In addition, the side member 15 of the central part frame 7 is fixed to the front part frame 1 and the rear part frame 3 by a vertical fastening member 37 passing through the protrusion coupling member 33 and the side member 15 in the vertical direction while overlapping the protrusion coupling member 33.

Meanwhile, a stay 39 is coupled to the side member 15 of the central part frame 7 to overlap an edge portion of the side members other than an edge portion surrounded by the protrusion coupling member 33.

In the present exemplary embodiment of the present disclosure, the stay 39 is formed to have an L-shaped cross-section to extend in the longitudinal direction of the side member 15.

Figure 9:
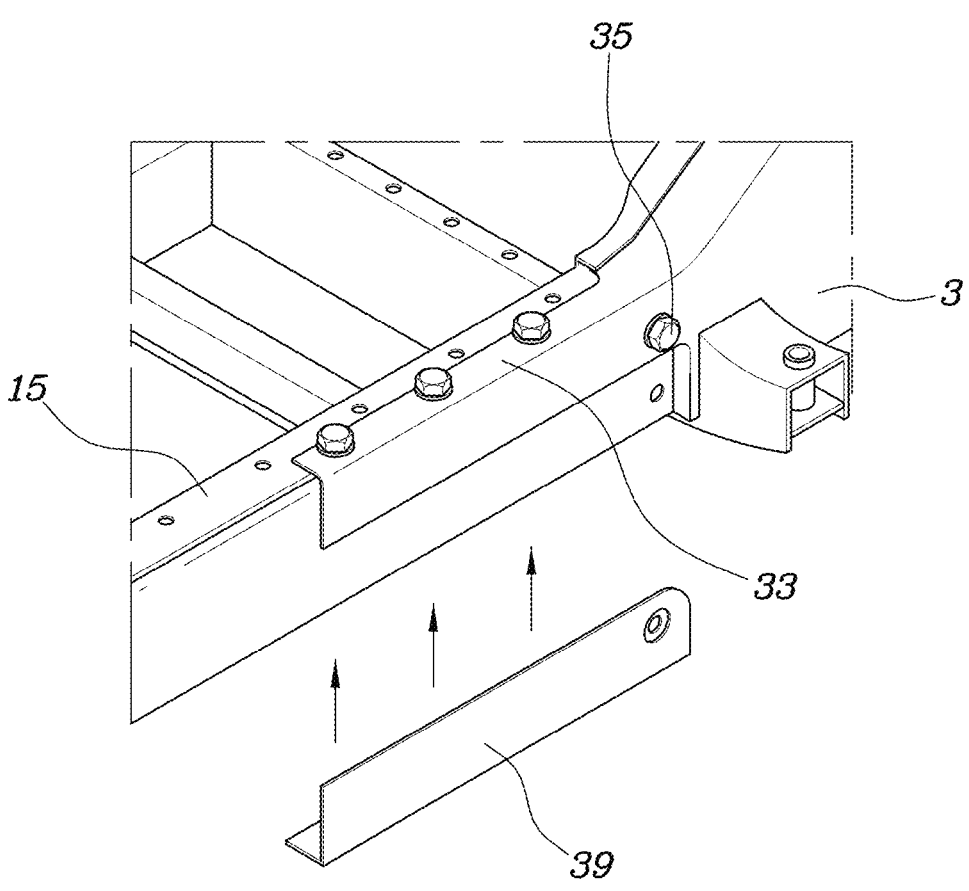
FIG. 9 is a view exemplarily illustrating that a stay is coupled to a coupling part of a central part frame and a rear part frame.
Figure 10:
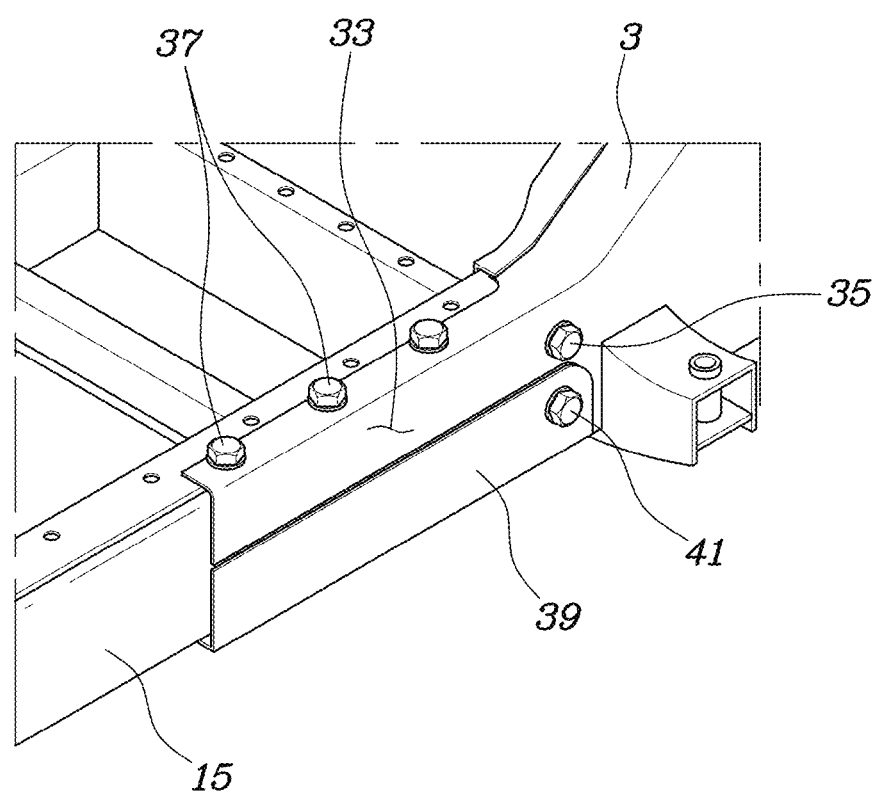
FIG. 10 is a view exemplarily illustrating a coupling pert of a central part frame and a rear part frame, which shows that a protrusion coupling member and a stay are coupled to a side member of a central part frame.
Figure 11:
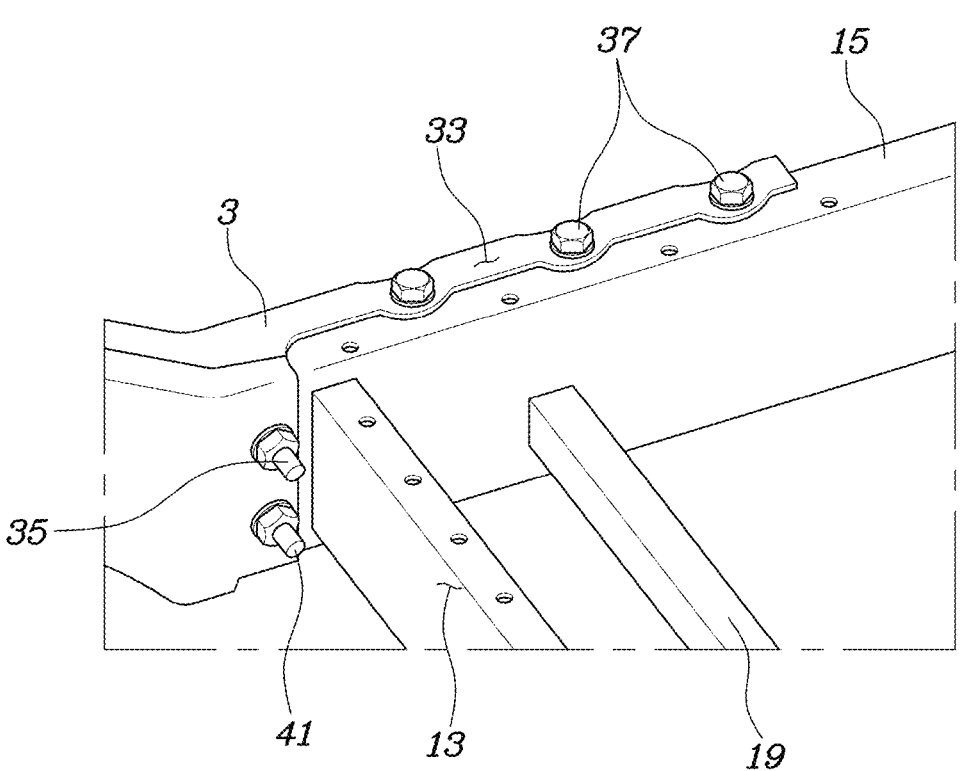
FIG. 11 is a view exemplarily illustrating the configuration when viewed from the side opposite FIG. 10.

That is, referring to FIGS. 9 to 11, the protrusion coupling member 33 is provided to surround the upper edge portion of the rectangular cross-section of the side member 15, and the stay 39 is provided below the protrusion coupling member 33 to surround the lower edge portion of the rectangular cross-section of the side member 15.

Furthermore, the vertical fastening member 37 passes through the stay 39, the side member 15, and the protrusion coupling member 33 in sequence and is then fastened.

Furthermore, the stay 39 is fixed to the side member 15 by a second horizontal fastening member 41 passing through the side member 15 and the stay 39 in the transverse direction.

That is, the protrusion coupling members 33 of the front part frame 1 and the rear part frame 3 and the stay 39 overlap the side members 15 of the central part frame 7, and are then fixed by the vertical fastening member 37, the first horizontal fastening member 35, and the second horizontal fastening member 41, and as a result, it is possible to secure a state in which the front part frame 1 and the rear part frame 3 are firmly fixed to the central part frame 7.

Figure 12:
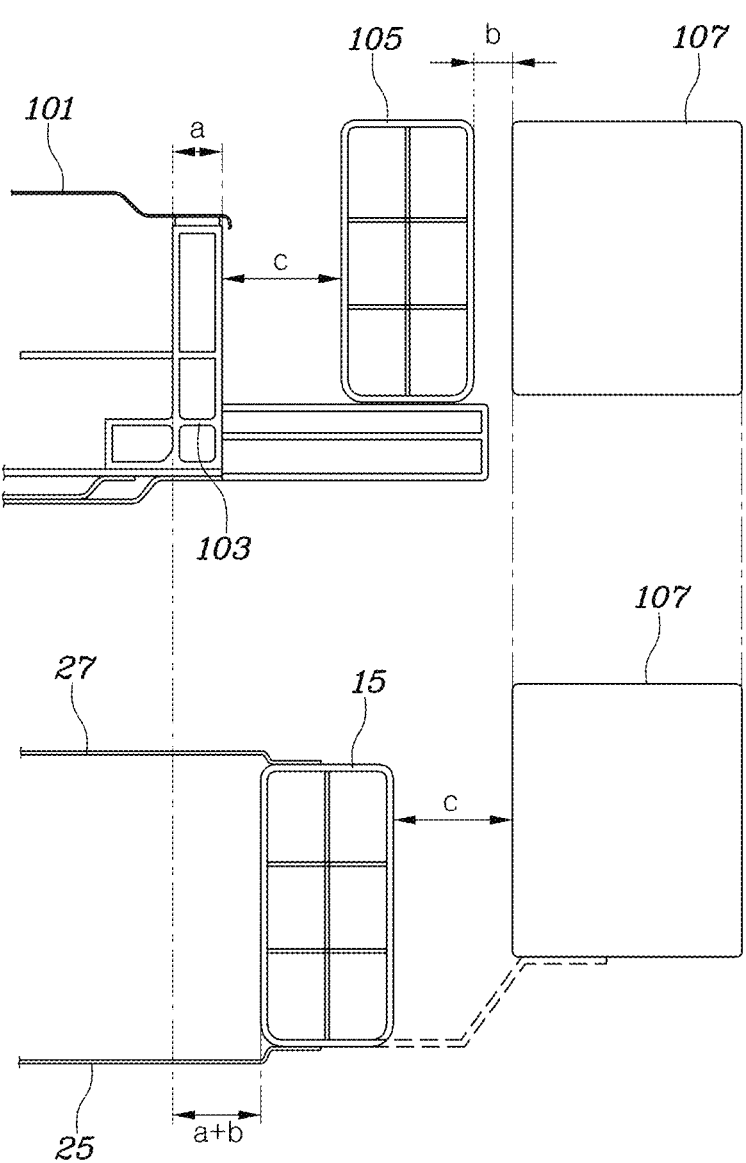
FIG. 12 is a view exemplarily illustrating effects according to an exemplary embodiment of the present disclosure and the related art.

For reference, FIG. 12 shows a cross-section of a battery mounting portions of a vehicle by comparing the case in which the frame 9 for an electric vehicle of the present disclosure is used with the case in which the conventional battery case is separately mounted to the vehicle.

The upper figure in FIG. 12 shows a battery case 101, a case side member 103 forming a wall thickness "a" of the battery case 101, a frame side member 105, as a frame, corresponding to the side member 15 of the present disclosure, and a vehicle body 107.

In the above related art, a wall thickness "a" of the battery case 101 for accommodating a battery module and a gap "b" necessary for assembling the frame to the vehicle body are required, and a gap "c" is required for preparing for a collision accident and for piping.

However, in the present disclosure shown in the lower figure in FIG. 12, the side member 15 of the central part frame 7 may also play the role of the wall of the battery case, and the gap "c" necessary for preparing for a collision accident and for piping may also play the role of the gap for assembling the frame 9 to the vehicle body. As a result, in the present disclosure, a spare space corresponding to the width "a+b" may be secured on one side of the battery, so that additional battery modules may be mounted.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the claims appended hereto and their equivalents.

What is claimed is:

1. A frame for a vehicle, the frame comprising:
a front part frame located at a front of the vehicle;
a rear part frame located at a rear of the vehicle; and
a central part frame configured in a flat shape to be directly coupled between the front part frame and the rear part frame to constitute a middle section of a main structural frame of the vehicle, and to accommodate a battery in the central part frame.

2. The frame of claim 1, wherein the central part frame is configured in a rectangular flat shape in which first and second sides facing each other are respectively connected to the front part frame and the rear part frame.

3. The frame of claim 1, wherein the central part frame includes:
a front member provided at the front to extend in a transverse direction of the vehicle;
a rear member provided at the rear to extend in the transverse direction of the vehicle; and
side members connected to first and second end portions of the front member and the rear member on first and second sides of the side members.

4. The frame of claim 3, further including:
a longitudinal member extending in a longitudinal direction of the vehicle and a transverse member extending along the transverse direction of the vehicle, which are provided inside a space formed by the front member, the rear member, and the side members, wherein a battery module forming the battery is provided inside a space formed by the longitudinal member and the transverse member.

5. The frame of claim 4, wherein the battery module is fixed to at least one of the longitudinal member and the transverse member inside the central part frame.

6. The frame of claim 4, wherein electric battery devices including at least one of a battery management unit (BMU), a power relay assembly (PRA) and a fuse are provided inside the space formed by the longitudinal member and the transverse member inside the central part frame.

7. The frame of claim 3, further including:

a lower case provided on a lower side of the central part frame to surround a lower side of the space formed by the front member, the rear member, and the side members; and an upper case provided on an upper side of the central part frame to surround an upper side of the space formed by the front member, the rear member, and the side members.

8. The frame of claim 7, further including a cooling module configured to cool the battery and provided in a space formed by the front member, the rear member, the side members, the upper case, and the lower case.

9. The frame of claim 8, where the cooling module is provided between the body panel and the lower case, so that a refrigerant circulates through the cooling module to cool the heat generated in the battery.

10. The frame of claim 3, wherein the front part frame and the rear part frame are integrally provided with protrusion coupling members, respectively, that protrude from end portions of the front part frame and the rear part frame facing the central part frame to overlap the central part frame.

11. The frame of claim 10, wherein each protrusion coupling member has an open cross-section surrounding a portion of a cross-section of the side members of the central part frame.

12. The frame of claim 11, wherein the side members of the central part frame have a rectangular cross-section, and wherein the protrusion coupling member has an L-shaped cross-section that surrounds one edge portion on an external side of a vehicle body having a rectangular cross-section of the side members.

13. The frame of claim 11, wherein first and second end portions of the side members of the central part frame are fixed to the front part frame and the rear part frame by a first horizontal fastening member passing through the protrusion coupling member and the side members in the transverse direction while being respectively inserted into the front part frame and the rear part frame.

14. The frame of claim 13, wherein the side members of the central part frame are fixed to the front part frame and the rear part frame by a vertical fastening member passing through the protrusion coupling member and the side members in a vertical direction while overlapping the protrusion coupling member.

15. The frame of claim 14, wherein a stay is coupled to the side members of the central part frame to overlap an edge portion of the side members other than an edge portion surrounded by the protrusion coupling member.

16. The frame of claim 15, wherein the stay has an L-shaped cross-section to extend in the longitudinal direction of the side members.

17. The frame of claim 16, wherein the vertical fastening member passes through the stay, the side members, and the protrusion coupling member in sequence and is then fastened to the stay, the side members, and the protrusion coupling member.

18. The frame of claim 17, wherein the stay is fixed to the side members by a second horizontal fastening member that passes through the side members and the stay in the transverse direction.

19. The frame of claim 18, wherein the protrusion coupling member is provided to surround an upper edge portion of the rectangular cross-section of the side members, and wherein the stay is provided below the protrusion coupling member to surround a lower edge portion of the rectangular cross-section of the side members.

* * * * *